Sept. 5, 1967  W. E. SMITH ET AL  3,340,238
METHOD FOR PRODUCING POLYMERS OF VINYL AROMATIC
SULFONATES CHARACTERIZED USEFUL AS FLOCCULANTS
Filed Sept. 7, 1962
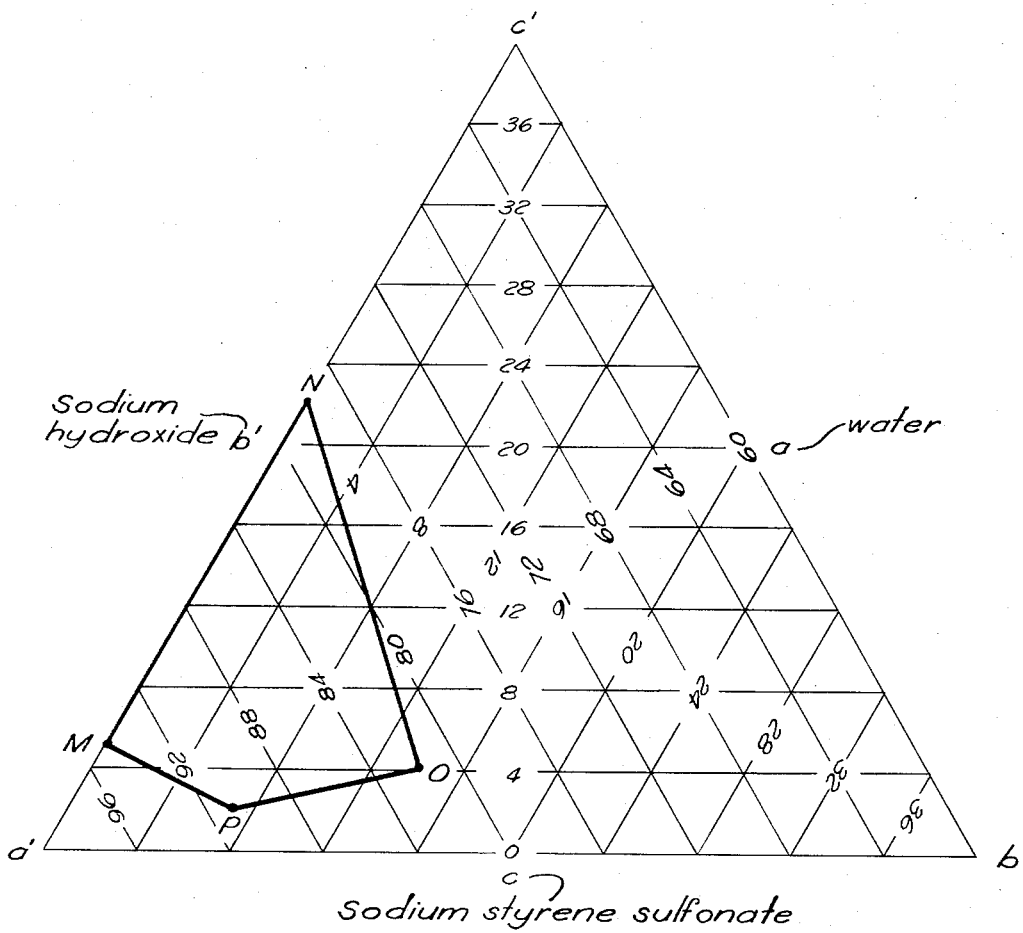
INVENTORS.
Henry Volk
William E. Smith
BY
William R. Norris
ATTORNEY

United States Patent Office 3,340,238
Patented Sept. 5, 1967

3,340,238
METHOD FOR PRODUCING POLYMERS OF VINYL AROMATIC SULFONATES CHARACTERIZED USEFUL AS FLOCCULANTS
William E. Smith, Midland, and Henry Volk, Bay City, Mich., assignors to The Dow Chemical Company, Midland, Mich., a corporation of Delaware
Filed Sept. 7, 1962, Ser. No. 222,097
6 Claims. (Cl. 260—79.3)

The present invention relates to a novel polymerization process. It particularly concerns a method for producing polymers of vinyl aromatic sulfonates to provide polyaromatic sulfonates characterized by exceptional utility as flocculants.

"Polyaromatic sulfonates," as employed herein, refers to polymeric resinous materials corresponding to linear polyalkane backbone polymers having integrally and chemically combined therein a plurality of vinyl aromatic sulfonate moieties.

In the past some polyaromatic sulfonates have been prepared by sulfonating a suitable polymeric backbone containing aromatic moieties, with one or more sulfonating agents such as concentrated sulfuric acid, chlorosulfonic acid or sulfur trioxide in a dispersing medium for the polymer and sulfonating agent. Though several patents teach improved sulfonation techniques, even the best of such direct sulfonation techniques usually results in some cross-linking, e.g., sulfone cross-linking and non-uniform sulfonation of the polymer. Normally, such cross-linking is manifested when the sulfonated polymer composition is dissolved or dispersed in a large amount of water and there results in the solution a small amount of a gel-like phase which can be separated from the dispersed polymer by filtration. While good flocculants can be prepared by the aforementioned sulfonation techniques, it would be desirable to provide improved polyaromatic sulfonate flocculants having complete water solubility. It would be especially desirable in this connection to provide polyaromatic sulfonates characterized by high molecular weights and uniform sulfonation, i.e., controlled substitution of sulfonate groups throughout linear polymer chains, which chains are substantially free of cross-linking such as sulfone cross-linking.

Though it is an apparent alternate route to the preparation of the polyaromatic sulfonates to polymerize vinyl aromatic sulfonate moieties, it has been the experience in the art that the directly polymerized polyaromatic sulfonates were generally characterized by relatively low molecular weights and inefficiency as flocculants.

Polyaromatic sulfonates prepared in accordance with the mehod of the present invention has estimated weight average molecular weights of at least 1 million and, at least in the instance of homopolymers of vinyl aromatic sulfonate moieties, they often have molecular weights as great as 10 to 12 million. Such materials are superior flocculants. For convenience herein, the directly polymerized polyaromatic sulfonates will be referred to as PAS polymers.

It is a principal object of the present invention to provide an improved process for polymerizing vinyl aromatic sulfonates. Especially, it is an object to provide a process whereby high molecular weight PAS polymers are prepared. A further object is to provide PAS polymers characterized by exceptional utility as flocculants. Other objects will become apparent hereinafter as the invention is more fully described.

The improved process of the invention involves homopolymerizing an alkali metal vinyl aromatic sulfonate, or coploymerizing the same with one or more suitable monoethylenically unsaturated comonomers, at a temperature within the range from about 0 to 100° C., in an aqueous reaction medium from which substantially all of the free oxygen has been removed. Further, it is essential that the polymerization be conducted in the presence of a sufficient amount of a basic alkali metal composition, i.e., alkali metal hydroxide, alkali metal carbonate or mixtures thereof, to produce a pH of at least about 11, preferably 12. The upper limit on the concentration of alkali metal composition varies inversely with the monomer concentration. As an upper limit range, the total amount of the alkali metal composition used should not exceed about 1 weight percent, at an upper monomer concentration of about 25 weight percent, and about 15 weight percent, at a lower monomer concentration of about 4 weight percent. The foregoing weight percentage figures are based on the total weight of the aqueous solution constituting the complete polymerization system. Monomers employed in the polymerization process can include any one or more of the vinyl aromatic sulfonates and as comonomers any ethylenically unsaturated monomer polymerizable with styrene and compatible with an alkali at a pH above 11.

When copolymers are prepared, the amount of the alkali metal vinyl aromatic sulfonate used to prepare flocculating grade, water-soluble, linear copolymers is at least 5 percent by weight of the monomer charge, with the further limitation that at least 40 percent of the total monomer charge is a hydrophilic monomer. "Water-soluble," as employed herein, means dispersible in water to provide a visually homogeneous solution infinitely dilutable with water.

Monomer concentration and pH control, as described above, are critical parameters and, when considered in conjunction with other process steps, these parameters account for the singularly effective results achieved in the practice of the invention.

Alkali metal vinyl aromatic sulfonates employed herein have the general formula:

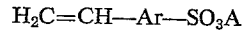

$$H_2C=CH-Ar-SO_3A$$

wherein Ar is a divalent monocyclic aromatic radical of the benzene series having its valences on nuclear, i.e., ring carbons, and A is an alkali metal. Techniques for the preparation of this monomer are known in the art. Usually, the preparative route involves hydrobromination of a vinyl aromatic compound employing a catalyst for anti-Markownikoff addition of the hydrogen bromide. Examples of such catalysts are the peroxides, actinic light and high energy ionizing radiation. The resulting beta-bromoethyl aromatic compound is reacted with a suitable sulfonating agent such as sulfur trioxide or chlorosulfonic acid to provide the corresponding beta-haloethyl aromatic sulfonic acid or sulfonyl chloride which is then contacted with an alkali metal hydroxide to provide the corresponding vinyl aromatic sulfonate salt. The alkali metal hydroxide, in addition to neutralizing the acid or hydrolyzing the sulfonyl halide, dehydrohalogenates the beta-haloethyl group to produce ethylenic unsaturation.

Suitable comonomers include non-acidic, monoethylenically unsaturated monomers and alkali metal salts of acidic, monoethylenically unsaturated monomers, which monomers are further characterized by a capability of polymerization with styrene and solubility in the polymerization system. Particular non-acidic monomers include such monoethylenically unsaturated hydrocarbons as ethylene, propylene, styrene, vinyl toluene, vinyl xylene, ethyl styrene, tertiary butyl styrene, vinyl cyclohexane, chlorostyrene, dichlorostyrene and bromostyrene. Further illustrations are found in the vinyl ethers such as vinyl methyl ether and vinyl ethyl ether. Acidic monomers usable in the form of their alkali metal salts include the acrylic acids such as acrylic acid, methacrylic acid, alpha-chloroacrylic acid, maleic acid, crotonic acid, vinyl benzoic acid and the like carboxyl containing monoethylenically unsaturated monomers. In view of the hydrolyzing character of the polymerization system, the corresponding acyl halides, amides, nitriles and esters of the foregoing acids are also suitable comonomers, but due to their reactivity with, or instability in the presence of, the alkali hydroxide they are to be considered as essentially acidic type monomers. Thus, other acidic type monomers are acrylyl chloride, methacrylyl chloride, acrylamide, methacrylamide, acrylonitrile, methacrylonitrile, vinyl acetate, vinyl propionate, vinyl benzoate and the like monomers reactive with basic alkali metal compositions.

Most of the aforementioned comonomers are liquid at some temperature within the specified temperature range; however, a few will be recognized as normally gaseous within this temperature range, and in such instances, it will be necessary to conduct the polymerization reaction under such pressures as will promote efficacious copolymerization of the gaseous monomer in solution.

In carrying out a polymerization operation in accordance with the present invention, substantially all oxygen in and above the reaction system is removed, as, for example, by subjecting the reaction system to a vacuum or by purging it with an inert gas such as nitrogen. Normally this means that oxygen is removed from the reaction system until the atmosphere above the reaction mass contains less than about 1.5 percent by weight oxygen, preferably less than about 0.02 percent by weight oxygen. This step is carried out at any convenient point during the charging of the reaction system, but is usually accomplished subsequent thereto. Upon removal of the oxygen, polymerization is automatically initiated. It is generally desirable, however, especially at lower temperatures within the aforementioned temperature range, to utilize a free radical generating means to initiate the polymerization reaction. However, equally good results are achieved by thermal initiation of the polymerization reaction within the range from about 30° to 100° C.

It is believed that the small quantities of residual oxygen are effective in inducing polymerization. It has been shown, for example, in experiments connected with the present invention that oxygen contents in the purging gas of as little as 5 parts per million can cause effective initiation of the polymerization reaction. The presence of amounts of oxygen such as are encountered by the reaction system in contact with air terminates the polymerization reaction.

Auxiliary free radical generating means that can be employed include the various chemical reagents for this purpose as well as radiation with such energy forms as actinic light, and high energy ionizing radiation. The latter includes gamma rays obtained from cobalt 60 sources of fission products, high energy electrons supplied by a betatron or a high voltage electron accelerator, X-rays and the like. From the standpoint of convenience, however, it is preferred to employ small but effective amounts of a free radical forming chemical reagent. Addition of such a catalyst is suitably accomplished by adding small aliquot portions of the total amount of catalyst desired at frequent intervals throughout, or at least during the early stages of, the polymerization reaction. Satisfactory results are usually achieved by the employment of from 0.001 to 0.01 weight percent of a chemical, free radical catalyst based on the weight of monomer.

The chemical, free radical catalysts can include any organic or inorganic material, which in an aqueous system, upon heating or contact with another chemical, yields free radicals. Examples of such materials are the inorganic peroxides such as hydrogen peroxide, barium peroxide, inter alia and the various organic peroxy catalysts, such as the dialkyl peroxides of which examples are diethyl peroxide, dipropyl peroxide, dilauryl peroxide, dioleyl peroxide, distearyl peroxide, di-tertiary-butyl peroxide, di-tertiary-amyl peroxide and the like. Other suitable peroxides include alkyl hydrogen peroxides, e.g., tertiary butyl hydrogen peroxide, acetyl peroxide, propionyl peroxide, lauroyl peroxide and the like. Further examples include cumene hydroperoxide, tertiary butyl perbenzoate and urea peroxide. Also operative are salts of inorganic peracids such as sodium persulfate, potassium persulfate, sodium percarbonate, potassium percarbonate, sodium perborate, potassium perborate, sodium perphosphate, potassium perphosphate, inter alia.

Water-soluble activators that can be employed in conjunction with the above peroxide catalysts include sulfur dioxide, the alkali metal bisulfites, hydrosulfites, thiosulfates, alkali metal sulfites, ethylsulfite and the like organic and inorganic compounds which are capable of undergoing oxidation.

Upon completion of the polymerization reaction, the PAS polymer produced can be recovered by means of conventional separatory techniques. An example is precipitating the polymeric product in the aqueous dispersion in which it is prepared with a water-miscible organic liquid such as the lower aliphatic alcohols, esters or ketones or mixtures thereof with water. Illustratively, the reaction mass is poured into methanol wherein soluble unreacted materials and reaction byproducts are maintained in solution as the polymeric product precipitates. Other methods for separating the polymerized products from the reaction medium involve dialysis or electrodialysis of the reaction mass followed by spray or drum-drying operations, with or without additional leaching of the PAS polymer product with a liquid alcohol or alcohol water mixture to remove soluble impurities.

The polymers produced by the invention are characterized herein in terms of their reduced viscosities, with a general correlation being that the higher the reduced viscosities the higher the molecular weights. Reduced viscosity ($N_r$) is defined by the following formula:

$$N_r = [(T/T_o) - 1]/C$$

wherein C is the concentration of the polyaromatic sulfonate in grams per hundred milliliters of an aqueous 0.5 N sodium chloride solution, T is the flow time of the above sodium chloride solution having dissolved therein 0.4 gram of the polyaromatic sulfonate and $T_o$ is the flow time of the aqueous 0.5 N sodium chloride solution, said flow times being obtained with an Ostwald viscosimeter at 30° C.

The following examples illustrate the invention but should not be construed as limitations thereon.

*Example 1*

A one liter flask equipped with a stirrer and sparging means was charged with 72 grams of sodium styrene sulfonate, 528 grams of water and 0.72 gram of sodium hydroxide (this was sufficient sodium hydroxide to produce a pH of 12). The resulting solution was then vigorously sparged with nitrogen for about 20 minutes and, with continued sparging, heated to a temperature of about 75° C. These conditions were maintained for a period of 88 hours after which the reaction mass was exposed to the atmosphere to terminate the polymerization reaction. Conversion of monomer to polymer was determined to be 36.7 percent.

The PAS polymer (sodium polystyrene sulfonate) was recovered by pouring the reaction mass into ethanol wherein the polymer precipitated. Separation of the polymer solids was effected by filtration and the resulting polymer dried to provide a granulated white powder.

An aqueous solution of the polymer was subjected to viscosity measurements made with an Ostwald viscosimeter at 30° C. The reduced viscosity, as this term is defined hereinbefore, of the polymer was found to be about 28 which corresponds to an estimated weight average molecular weight of about 5.7 million.

Example 2

In the present example, the PAS polymer is prepared in a manner similar to that of the foregoing example except that a free radical catalyst is added to the reaction system to enhance the rate of polymerization. To a stainless steel, 10 gallon autoclave, equipped with a stirrer, was charged 5.5 pounds of sodium styrene sulfonate, 37.5 pounds of water and 2.5 pounds of sodium hydroxide. The resulting solution was heated to a temperature of 70° C. and sparged vigorously with nitrogen for about 30 minutes. Thereafter, with continued sparging at a lower rate, 10 cubic centimeters of a 0.06 percent aqueous solution of potassium persulfate was added to the reaction mass. This was repeated hourly for 11 hours after which the reaction mass was heated an additional 4 hours. Thereafter the reaction mass was exposed to the atmosphere to terminate the polymerization reaction.

The reaction mass was analyzed for residual monomer by means of the standard bromate-bromide titration technique. On the basis of the residual monomer determination, the conversion of monomer to polymer was found to be 60.9 percent. The polymer itself had a reduced viscosity of about 55 which corresponds to an estimated molecular weight of 11.7 million. When employed to flocculate an aqueous suspension of finely divided clay at a loading rate of 0.1 pound of polymer per ton of clay, the polymer produced a settling rate of 17.7 inches per minute.

Example 3

In numerous other polymerizations conducted in a manner similar to that of Example 1, except that a small specified amount of potassium persulfate was employed to accelerate the polymerization reaction, additional information delimiting significant reaction mass composition variables with respect to the polymerization of sodium styrene sulfonate was compiled and employed in making the accompanying drawing.

In the drawing, the relative proportions of ingredients required to produce water-soluble high molecular weight alkali polystyrene sulfonates, i.e., having a reduced viscosity of at least about 10, are delimited by the polygon defined by the lines connecting consecutively the points M, N, O and P. These points are defined, respectively, by the coordinates (94.8, 0.2, 5), (77.9, 0.1, 22), (82, 14, 4) and (91, 7, 2) wherein the bracketed groups of coordinants are for the $aa'$, $bb'$ and $cc'$ axes of the graph, respectively.

The line passing through the points M and N represents, with respect to the basic alkali metal component, the minimum amount of this material which is required for successful operation under the invention. This minimum amount can also be expressed as that amount of basic alkali metal compound sufficient to produce a reaction mass having a pH of at least 11. This is a critical limit. Without such pH the molecular weight of the products achieved will be considerably less than the aforementioned minimum.

Other lines, such as those passing through the points $\overline{NO}$, $\overline{OP}$ and $\overline{PM}$, delimit the critical marginal reaction conditions necessary to produce ultrahigh molecular weight, linear polymers effective as flocculants. Line $\overline{NO}$ delimits those marginal reaction conditions, insofar as composition of the reaction mass is concerned, outside of which cross-linked polymeric systems begin to be produced. Lines $\overline{OP}$ and $\overline{PM}$ delimit composition proportions within which ultrahigh molecular weight polymers of superior flocculent activity are produced.

Example 4

Additional operations were carried out whereby comparative data were obtained to illustrate the effect of an elevated pH on solution homopolymerization of sodium styrene sulfonate and copolymerization thereof with a variety of comonomers. The experimental procedure for each polymer involved charging predetermined quantities of the monomers to be polymerized, water and caustic as needed to produce a desired pH, to a suitable laboratory reaction vessel. The polymerization reaction was conducted in a manner substantially identical to that employed in the previous examples, i.e., under a nitrogen atmosphere, with a small amount of potassium persulfate as a free radical catalyst, at an elevated temperature of about 70° C., and for a fixed period of time. Two runs were made for each polymer under identical conditions except that one run was conducted at a pH below 11 and another run at or above a pH of 12. The resulting polymers were recovered by precipitating them in methanol after which they were dried and their reduced viscosities ascertained.

Each of the polymers prepared in the manner described above was tested to determine its efficacy as a flocculant. The polymers were applied in the form of a dilute solution and at predetermined loadings, to an aqueous suspension of clay contained in a 100 milliliter graduate. The polymer was thoroughly mixed with the clay suspension by inverting the graduate three times. Thereafter the resulting average settling rate in inches per minute was determined by visual observation. Polymer loadings and the observed settling rates are set forth, along with significant parameters of the polymerization reaction, in the following table. For the purpose of comparison one run was made in which no polymer was added to the clay suspension. The observed settling rate for this run was 0.23 inch per minute.

TABLE 1

| Run | Reaction System | | | | | | Polymer Reduced Viscosity ($N_r$) | Loading Rate, lbs./ton clay | Settling Rate, inches/min. |
|---|---|---|---|---|---|---|---|---|---|
| | Comonomer | Gms. | SPSS,[1] gms. | H₂O, gms. | K₂S₂O₈, percent[2] | Polymerization, pH | | | |
| 1 | Sodium maleate | 31.5 | 66.5 | 502 | 0.01 | 12.2 | 19.6 | 0.4 | 0.96 |
| 2 | do | 31.5 | 66.5 | 502 | | 8 | 2.3 | 0.4 | 0.31 |
| 3 | Acrylic acid | 18 | 51.5 | 478 | 0.01 | >12 | 15.6 | 0.4 | 1.26 |
| 4 | do | 18 | 51.5 | 478 | | 7 | 2.2 | 0.4 | 0.29 |
| 5 | Styrene | 26 | 51.5 | 451 | 0.01 | 12 | 12.8 | 0.4 | 0.99 |
| 6 | do | | | | | 8 | 3.2 | 0.4 | 0.53 |
| 7 | (3) | | | | 0.005 | 2.8 | 2.7 | 0.1 | 0.29 |
| 8 | (3) | | | | 0.005 | >12 | 15.4 | 0.1 | 0.56 |

[1] Sodium styrene sulfonate.
[2] Percent by weight based on the monomer.
[3] Homopolymer of sodium styrene sulfonate prepared in 12.1% aqueous solution of the monomer.

In a manner similar to that of the foregoing examples other high molecular weight polyvinyl aromatic sulfonate polymers and copolymers of vinyl aromatic sulfonates with suitable monoethylenically unsaturated monomers having excellent capabilities as flocculants are prepared by substituting for the sodium styrene sulfonate in the foregoing examples one or more of such vinyl aromatic sulfonate monomers as potassium styrene sulfonate, sodium ortho-, meta-, or para-vinyltolyl sulfonate, sodium ar-vinyl methyoxyphenyl sulfonate, potassium ar-vinylxylyl sulfonate, sodium ar-vinyl diethoxyphenyl sulfonate, sodium vinyl chlorophenyl sulfonate and the like alkali metal vinyl aromatic sulfonates of the benzene series. Other basic alkali metal compounds that can be employed in the place of all or a part of the sodium hydroxide in the foregoing examples to adjust the pH of the polymerization system include potassium hydroxide, sodium carbonate and potassium carbonate.

What is claimed is:

1. In a method which comprises polymerizing, at a temperature within the range of from about 0 up to 100° C. and in the presence of a free radical catalyst, in the form of an aqueous solution substantially free of oxygen, from about 2 up to about 25 percent by weight, based on the weight of the aqueous solution, of a monomer composition selected from the group consisting of monocyclic alkali metal vinyl aromatic sulfonates of the benzene series and mixtures thereof with monoethylenically unsaturated monomers polymerizable with styrene which mixture contains at least 5 weight percent of the vinyl aromatic sulfonate and at least 40 weight percent of a hydrophilic monomer, to provide a water-soluble polymer, the improvement which consists in adding to the aqueous system a sufficient amount of a basic alkali metal composition selected from the group consisting of alkali metal hydroxides and alkali metal carbonates to produce a pH of at least 11, but not exceeding an upper limit within the range from about 1 weight percent, at the above specified upper limit of monomer composition concentration, to about 15 weight percent, at the above specified lower limit of monomer composition concentration, said weight percentages being based on the total weight of the aqueous system.

2. In a method which comprises polymerizing, at a temperature within the range of from about 0 up to 100° C. and in the presence of a free radical catalyst, in the form of an aqueous solution substantially free of oxygen, from about 2 up to about 25 percent by weight, based on the weight of the aqueous solution, of a monocyclic, alkali metal vinyl aromatic sulfonate to provide a water-soluble polymer, the improvement which consists in adding to the aqueous solution of the alkali metal vinyl aromatic sulfonate a sufficient amount of a basic alkali metal composition selected from the group consisting of alkali metal hydroxides and alkali metal carbonates to produce a pH of at least 11, but not exceeding an upper limit within the range from about 1 weight percent, at the above specified upper limit of monomer concentration, to about 15 weight percent, at the above specified lower limit of monomer concentration, said weight percentages being based on the total weight of the aqueous solution.

3. In a method which comprises polymerizing, at a temperature within the range from about 0 up to 100° C. and in the presence of a free radical catalyst, in the form of an aqueous solution substantially free of oxygen, from about 2 up to about 25 percent by weight, based on the weight of the aqueous solution, of a mixture of a monocyclic alkali metal vinyl aromatic sulfonate of the benzene series with a monoethylenically unsaturated monomer polymerizable with styrene which mixture contains at least 5 weight percent of the vinyl aromatic sulfonate and at least 40 weight percent of a hydrophilic monomer, to provide a water-soluble polymer, the improvement which consists in adding to the aqueous solution of the monomer mixture a sufficient amount of a basic alkali metal composition selected from the group consisting of alkali metal hydroxides and alkali metal carbonates to produce a pH of at least 11, but not exceeding an upper limit within the range from about 1 weight percent, at the above specified upper limit of monomer concentration, to about 15 weight percent, at the above specified lower limit of monomer concentration, said weight percentages being based on the total weight of the aqueous solution.

4. A method which comprises the steps of (1) mixing together sodium styrene sulfonate, water and sodium hydroxide, the amounts of the aforesaid components being within the range of proportions, having reference to the drawing, delimited by the polygon defined by lines connecting consecutively the points M, N, O and P, said points being specified by the coordinates on the $aa'$, $bb'$ and $cc'$ axes of the ternary graph, respectively, of (94.8, 0.2, 5), (77.9, 0.1, 22), (82, 14, 4) and (91, 7, 2); (2) removing substantially all of the oxygen from the resulting reaction mass and (3) while maintaining the reaction mass at a temperature within the range from about 0° to about 100° C., subjecting it to polymerization initiating means in the form of a free radical catalyst for a period of time sufficient to convert at least a substantial proportion of sodium styrene sulfonate to a water-soluble polymerized product.

5. A process as in claim 4 wherein step (3) is replaced by heating the reaction mass at a temperature within the range from about 30° to 100° C. for a period of time sufficient to convert a substantial proportion of the sodium styrene sulfonate to a water-soluble polymerized product.

6. A process as in claim 4 wherein step (3) is replaced by adding a small but effective amount of a chemical free radical catalyst to the reaction mass to promote polymerization and maintaining the reaction mass at a temperature within the range from about 30° to about 100° C. for a period of time sufficient to convert at least a substantial proportion of the sodium styrene sulfonate to a water-soluble polymerized product.

References Cited

UNITED STATES PATENTS

| | | | |
|---|---|---|---|
| 2,909,508 | 10/1959 | Jones | 260—79.3 |
| 2,971,935 | 2/1961 | Floria | 260—79.3 |
| 3,067,161 | 12/1962 | Roth | 260—79.3 |
| 3,121,071 | 2/1964 | Sheetz et al. | 260—79.3 |
| 3,206,445 | 3/1964 | Volk | 260—79.8 |

JOSEPH L. SCHOFER, *Primary Examiner.*

H. WONG, *Assistant Examiner.*